April 21, 1953  W. H. SILVER ET AL  2,635,517
DISK PLOW
Filed Jan. 26, 1946  3 Sheets-Sheet 1

INVENTORS.
WALTER H. SILVER
WILLIAM V. LOHRMAN
BY
ATTORNEYS

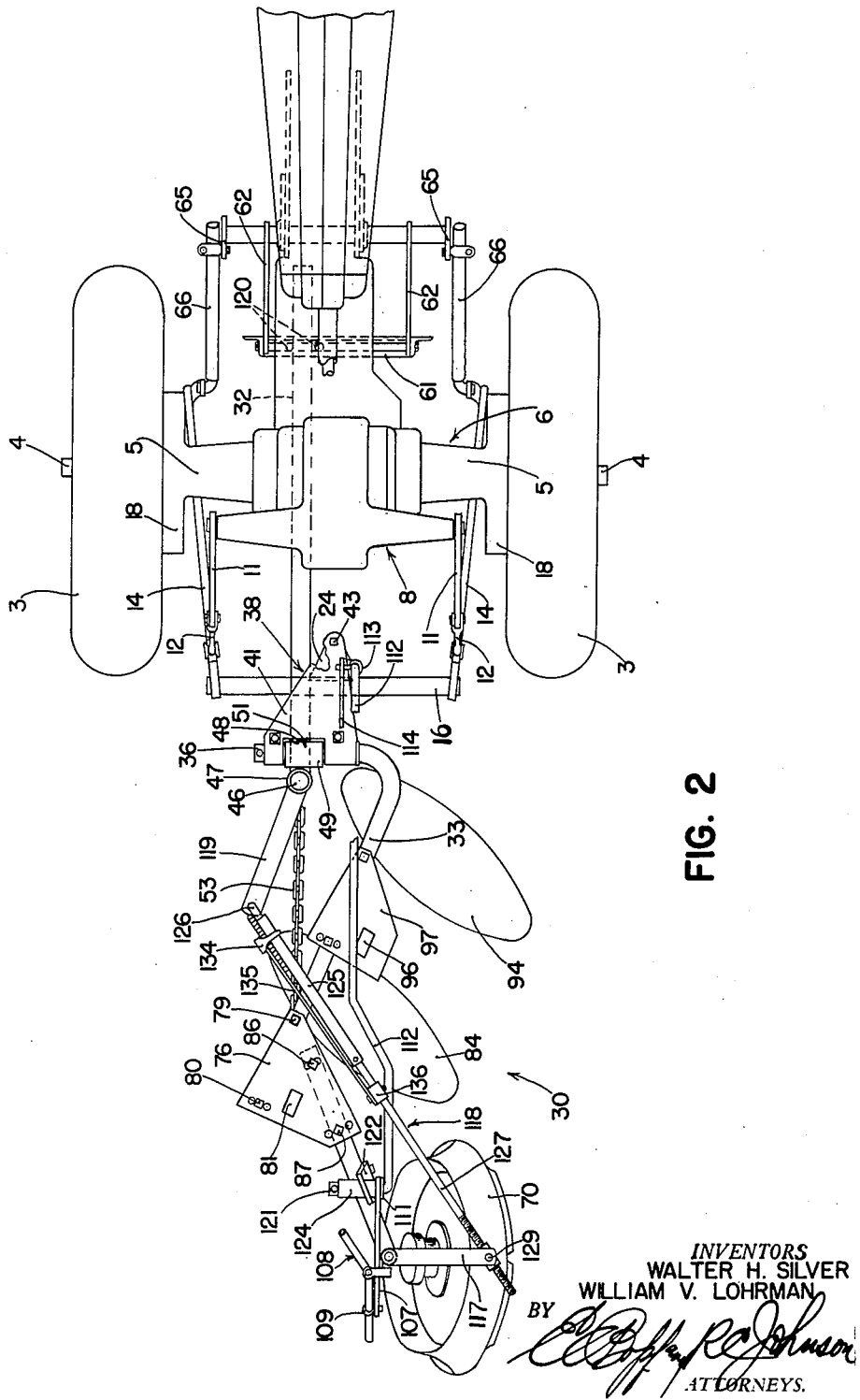

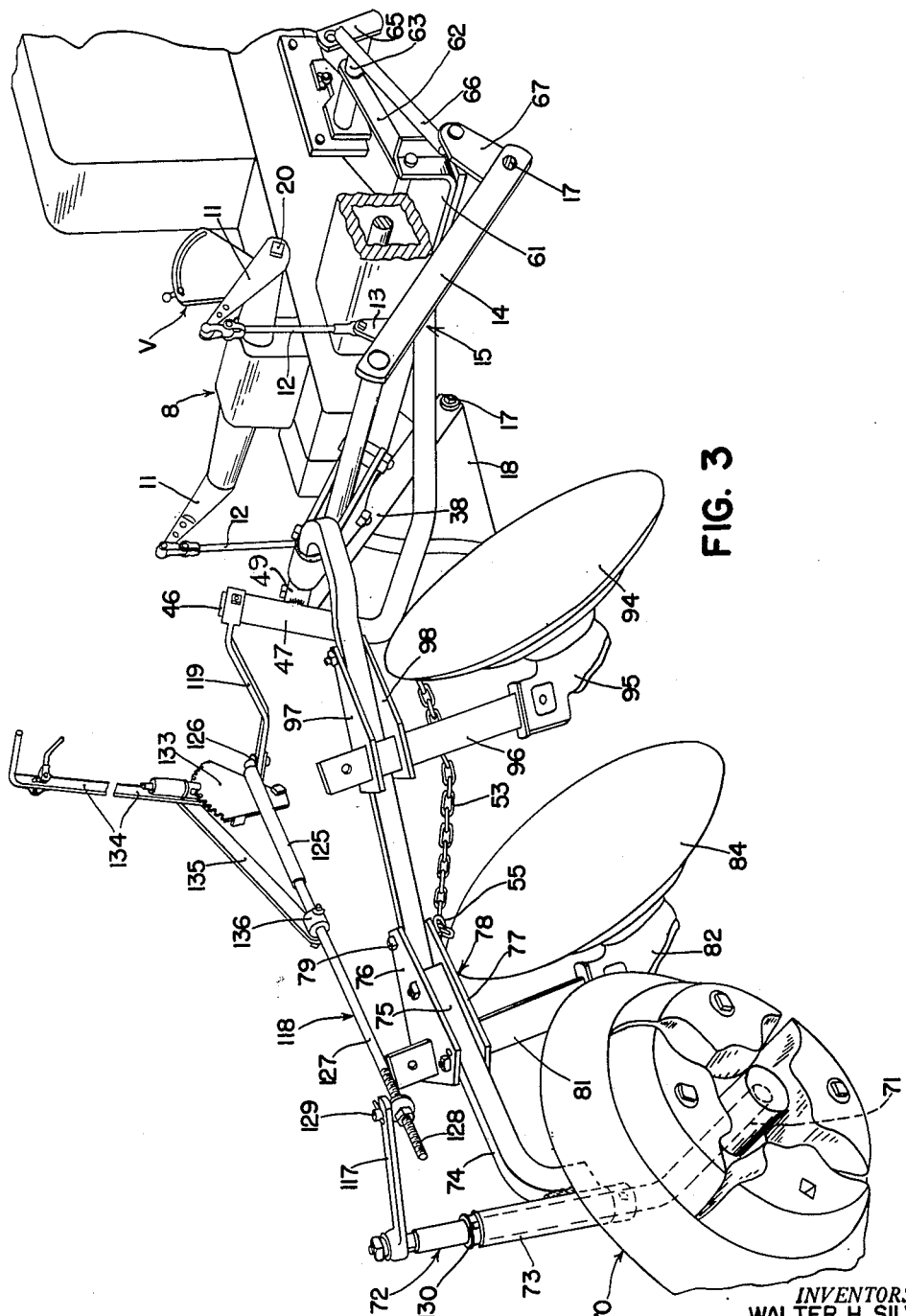

Patented Apr. 21, 1953

2,635,517

UNITED STATES PATENT OFFICE 2,635,517

DISK PLOW

Walter H. Silver, Moline, Ill., and William V. Lohrman, Davenport, Iowa, assignors to Deere & Company, Moline, Ill., a corporation of Illinois Application January 26, 1946, Serial No. 643,512

17 Claims. (Cl. 97—50)

1

The present invention relates generally to tractor mounted implements and is more particularly concerned with ground working tools such as plows and the like.

The object and general nature of the present invention is the provision of a tractor mounted implement particularly arranged and constructed for quick and easy connection with and disconnection from the tractor. More particularly, it is a feature of this invention to provide a semi-integral disk plow adapted to be connected with and disconnected from its supporting tractor merely by manipulating two or three parts, which may be done easily and conveniently in a very short period of time. A "semi-integral" implement is one which is supported partly on its own ground wheel or wheels and partly on the tractor which propels it.

More specifically, it is an important feature of this invention to provide a semi-integral quick detachable implement which is supported at its front end on the tractor and at its rear end on a ground wheel, and it is a further feature of this invention to provide a steering connection between the rear furrow wheel and a part of a hitch that moves generally laterally with the tractor whereby the outfit may operate satisfactorily along curved terraces and under other conditions where more or less turning is required. Still further, it is a feature of this invention to provide a semi-integral implement, such as a plow, in which a support or beam structure is provided whereby raising or lowering the front end thereof serves to control the depth of operation and in which articulated parts are provided so that raising the intermediate portion of the support or beam structure, as by the power lift bail or other member on the tractor, serves to raise the ground working tools into a transport position and generally about the rear wheel of the implement as a fulcrum.

It is also a feature of this invention to provide a semi-integral implement connected with the tractor for lateral swinging movement and raised and lowered by the power lift member on the tractor, with connections especially constructed to accommodate any lateral swinging of the implement relative to the tractor without affecting the action and/or efficiency of the lifting arrangement.

These and other objects and advantages of the present invention will be apparent to those skilled in the art after a consideration of the following detailed description, taken in conjunction with the accompanying drawings, in which

2

Figure 2 is a plan view of the implement shown in Figure 1.

Figure 3 is a perspective view of the plow shown in Figures 1 and 2, with the exception that the means for raising the rear end of the plow relative to the rear furrow wheel has been omitted.

Figure 1:
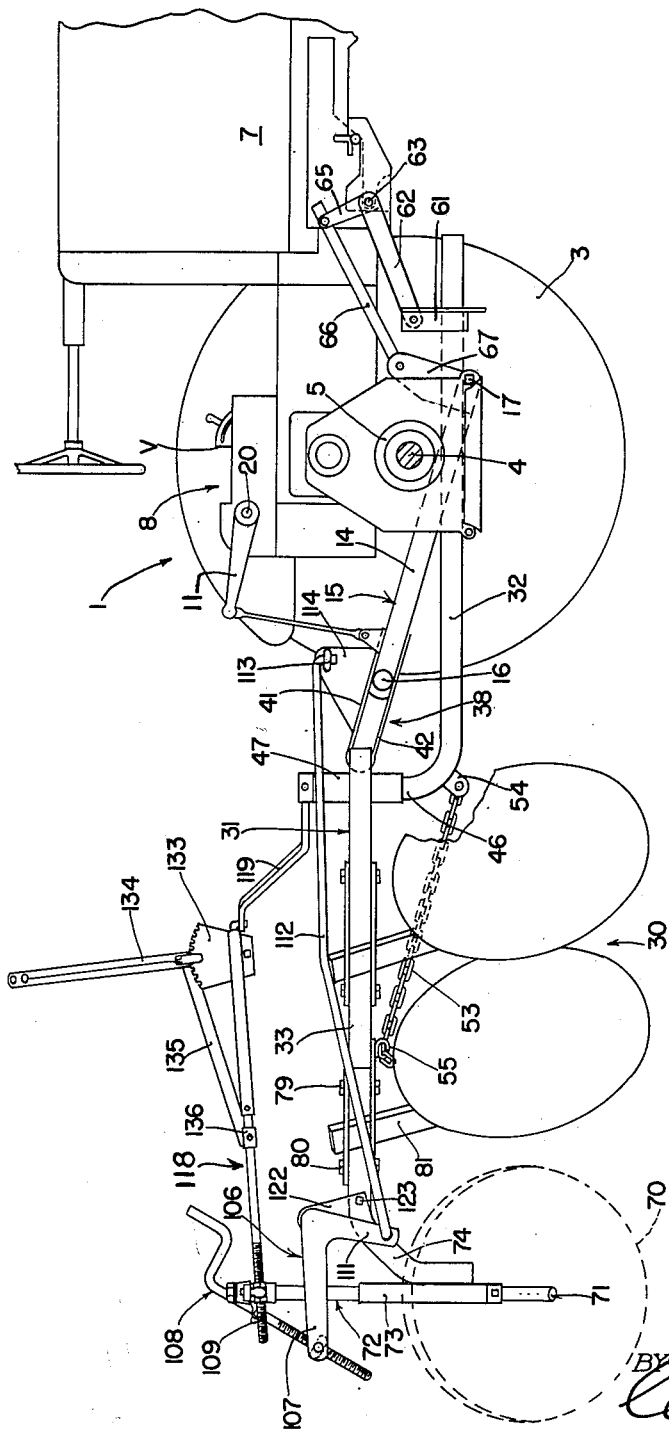
Figure 1 is a side view of a semi-integral tractor mounted disk plow in which the principles of the present invention have been incorporated.

Referring now more particularly to Figures 1 and 2, the tractor is indicated in its entirety by the reference numeral 1 and includes a pair of front wheels and a pair of rear traction wheels 3 mounted on axle shafts 4 that are carried in extensions 5 forming a part of the rear axle structure 6 of the tractor. The tractor includes a power plant 7 and a power lift unit 8 of the hydraulic type, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The sides 14 may be strap members, and the latter are pivoted at their front ends, as at 17, to drop housings 18 which form a part of the tractor rear axle structure 6. Preferably, the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8. As best shown in Figure 2, a lug 24 is welded or otherwise permanently fixed to the central section 16 of the tractor drawbar 15 and is apertured to receive the hitch connection of an implement adapted to be connected therewith, such as a semi-integral disk plow of the type described below. The unit 8 is so constructed that the drawbar 15 is capable of swinging upwardly freely but its lower position is determined by the position of the valve V and associated parts. Hydraulic mechanism of this type is shown in U. S. Patent 2,477,710, issued August 2, 1949, to Charles C. Worstell, to which reference may be made if necessary.

The disk plow that is adapted to be attached to the tractor 1 is indicated in its entirety by the reference numeral 30 and comprises a plow beam structure 31 of the articulated type. Specifically, the member 31 is made up of a forward plow beam section 32 and a rear plow beam section 33. The rear beam section 33 preferably is in the nature of a generally diagonally extending square bar having its forward end portion bent so as to extend laterally or transversely, as indicated at 36 in Figure 2. This portion of the plow beam structure is adapted to be hingedly connected as well as pivotally connected with the tractor drawbar 15 by means that includes an attachment socket member or drawbar-receiving member, indicated in its entirety by the reference numeral 38. This member, which may be constructed of flat plate or sheet stock bent or shaped so as to provide an upper plate section 41 and a lower plate section 42, the sections being spaced apart so as to receive the tractor drawbar lug 24, the rear portion of the member 38 being curved so as to snugly receive the laterally directed front end section 36 of the rear plow beam section 33. The laterally directed front end section 36 is rounded, whereby the rear plow beam member 33 may pivot relative to the attachment member 38 about a generally transverse axis. Thus, the connection between the drawbar-receiving member 38 and the plow beam section 33 is in the nature of a hinge, in which the hingedly connected parts may swing upwardly and downwardly, one relative to the other about a transverse axis, yet the fairly wide contact between the member 38 and the tractor drawbar 15 serves to stabilize the plow beam structure 31 and prevents the same from being displaced about a generally longitudinal axis.

The forward plow beam section 32 comprises a pipe or rod in the form of a boom having an upturned portion 46 at its rear end. This part 46 is disposed within a vertical sleeve section 47 that forms a part of a swivel member 51. This member also includes a horizontal sleeve section 49, the sections 47 and 49 being welded or otherwise secured rigidly together. The section 49 is disposed on the laterally turned end 36 of the rear plow beam section 33, the plate sections 41 and 42 being cut out, as at 48, for this purpose. In this way, the two plow beam sections 32 and 33 are hingedly connected together for movement one relative to the other about a transverse axis as defined by the beam end 35. A chain 53 is connected at its forward end to a lug 54 welded to the rear portion of the front plow beam section 32. At its rear end the chain 53 is engaged with a hook 55 that is bolted or otherwise fixed to the rear plow beam section 33. The chain 53 serves as a limit preventing upward swinging of either of the plow beam sections relative to the other beyond the position shown in Figure 1, or, in other words, each of the two plow beam sections 32 and 33 is rigid against vertical displacement in an upward direction relative to the other from the position shown in Figure 1. The front end of the forward plow beam section 32 is received in a suspension yoke 61, which preferably is in the form of a bail member swingably connected to the rear ends of a pair of arms 62 which are fixed to a transverse rockshaft 63. The latter also has arms 65 rigidly secured thereto, as by welding, and the arms 65 are connected by links 66 to vertical arms 67 that are fixed to the sides 14 of the tractor drawbar 15, preferably adjacent the pivotal connection 17 between the tractor drawbar 15 and the tractor drop axle housings 18.

The rear end of the plow beam structure is supported on a rear furrow wheel 70 which is journaled on the laterally outturned end 71 of a vertical spindle 72. The latter is slidably and rotatably disposed in a sleeve section 73 which is fixed to an angular bracket 74, such as by welding, and the forward end 75 of the bracket 74 is disposed between the upper and lower plates 76 and 77 of an attaching bracket structure 78 which is bolted, as at 79 and 80, to the rear plow beam part 33. The bracket plates 76 and 77 are welded to the upper end of a disk standard 81, the lower end of which carries suitable bearing means 82 to receive the associated disk furrow opener 84. As best shown in Figure 2, the upper and lower plates 76 and 77 are apertured to receive a pair of bolts 86 and 87 by which the bracket 74 is secured firmly and rigidly to the disk standard bracket plates. The bracket 74 may be adjusted angularly in a horizontal plane by virtue of providing slots and/or a number of apertures in the plates 76 and 77 to receive the bolts 86 and 87. The plates 76 and 77 are similarly adjustable on the plow beam bar 34.

A forward disk furrow opener 94 is mounted by bearing means 95 on the lower end of a disk standard 96, and the latter is fixed, as by welding, to a pair of upper and lower plates 97 and 98, and the plates 97 and 98 are adjustably connected to the plow beam bar 33 in the same manner as the rear plates 76 and 77. Preferably, both of the disk standards 81 and 95 extend upwardly beyond the upper plates 76 and 97 so as to provide for the attachment of scraper supporting arms. For purposes of clarity, the scrapers, which are conventional, have been omitted.

The plow beam, which constitutes the main frame of the plow, may be raised and lowered relative to the rear furrow wheel by swinging a bell crank 106, the rear arm 107 of which is connected by a crank screw 108 to a swivel 109 carried at the upper end of the rear furrow wheel spindle 72. The other arm 111 of the bell crank 106 is connected by a link 112, which may be made adjustable as necessary, to a swivel eye 113 which is carried on a vertical bracket 114 that is welded or otherwise fixed to the attachment socket member 38. A steering arm 117 is also connected to the upper end of the furrow wheel spindle 72 and extends laterally outwardly therefrom. The outer end of the arm 117 is apertured to receive the rear end of a steering link 118, the forward end of which is pivotally connected to the outer end of an arm 119 that is rigidly secured to the upper end of the vertically disposed portion 46 of the forward plow beam bar 32. The bell crank 106 is rockably mounted on a stub shaft 121 that is carried by a bracket 122 bolted, as at 123, to the bar 74. A sleeve 124 is fixed to the bracket 122 and provides bearing support thereon for the stub shaft 121. The steering link 118 comprises two relatively movable parts, the first comprising a sleeve 125, the forward end of which includes a hook section 126 that is pivotally connected with the outer end of the arm 119, and a rear section 127 which is slidable in the sleeve section 125 and is threaded at its rear end, as indicated at 128. This end is adjustably connected by means of a swivel 129 to the outer end of the steering arm 117. For holding the two link members 125 and 127 in any position of adjustment, we provide a sector 133 that is fixed, as by welding, to the sleeve section 125, and pivotally connected to the sector 133 is a hand lever 134 to which an adjusting link 135 is pivoted at its forward end. The rear end of the link 135 is pivotally connected by an adjustable clamp collar 136 to the rear link section 127. By releasing the detent mechanism of the hand lever 134 and swinging the latter in one direction or the other, the effective length of the link structure 118 may be adjusted so as to vary the relation between the steering arms 117 and 119. This adjustment may be necessary at times in order to give the proper lead to the rear furrow wheel 70.

The operation of the implement described above is substantially as follows. When in operating or plowing position, the parts are disposed as shown in Figure 1. If it should be desired to decrease the depth of plowing, the operator operates the valve mechanism V so as to raise the tractor drawbar 15 the desired amount. The upward swinging of the drawbar 15 exerts a forward thrust through the links 66, swinging the pairs of arms 62, 65 so as to raise the bail or yoke 61, thus raising the front end of the plow beam structure, specifically, the front end of the forward plow beam section 32. Since in operating position the draft force is applied to the front end of the rear plow beam section 33 at a relatively high point while the soil resistance is applied to the lower portions of the disks 84 and 94, there is a tendency for the rear end of the rear beam section to swing upwardly relative to the front beam section 32 and the drawbar 15 about the transverse axis defined by the laterally extending beam portion 36. This movement is, however, resisted by the chain 53, as best shown in Figure 1. Therefore, in operation, the chain 53 forms a rigid connection between the two plow beam sections. The linkages are so arranged that the front end of the rear beam section 33 and the lifting bail 61 supporting the front end of the front beam section 32 are raised and lowered substantially the same amount. When the drawbar 15 is raised the front beam section 32 is lifted bodily but the rear furrow wheel 70 remains in contact with the ground, the rear beam section 33 pivoting downwardly about the aforesaid transverse axis relative to the drawbar 15 and the front beam section 32. As a result, the connecting chain 53 momentarily is slackened, but as soon as the rear furrow wheel 70 has moved forward a few feet, it begins to run along the bottom of the furrow that is now becoming more shallow, so that after a short distance the furrow openers 84 and 94 are brought back to a level relation but at the desired reduced depth of operation and the chain 53 again becomes taut.

From this description it will be seen that in operation the two hingedly connected plow beam sections 32 and 33 are so connected and arranged as to act as a rigid part, since the chain 53 holds the rear beam section 33 at a given angle relative to the front beam section 32. However, if the rear wheels of the tractor should pass over a ridge or the like, the rear wheel 70 would remain on the ground and the rear or main beam section 33 would pivot downwardly, relative to the tractor and the front beam section 32, about the transverse axis at 36, which would cause the chain 53 to slacken momentarily until the tractor wheels passed beyond the ridge. When the rear furrow wheel 70 reached the ridge, the entire plow, including the front and rear beam sections 32 and 33, would shift upwardly, together with the tractor drawbar 15, the power lift unit 8 permitting the relatively free upward movement of the drawbar 15 as explained above. Substantially the same action takes place when, for example, the rear wheels 3 of the tractor momentarily drop into a depression or low place in the ground. The connection 53 may be made adjustable by any suitable means, such as by hooking one or the other of different links of the chain 53 in the hook 55. Preferably, the latter is mounted on the lower end of the bolt 79. Since the soil pressure against the disks 84 and 94 acts at points below the connection between the drawbar 15 and the beam bar 33, and the chain 53 prevents the bar 33 from swinging upwardly about the transverse axis at 36 relative to the drawbar 15 and the front bar 32, the front end of the plow beam bar 32 is caused to bear firmly and positively down against the bail or yoke 61 at all times that the outfit is in operation. Referring for the moment to Figure 2, it will be noted that the front end of the bar 32 is held against lateral displacement in the yoke or bail 61 by one or more bolts 120.

As best shown in Figure 2, the plow may swing laterally relative to the tractor either in one direction or the other about the pivot bolt 43 as an axis. This action is necessary, particularly when operating around a curve, as when following or running parallel to terraces, grass strips and the like. When the plow pivots relative to the tractor about the vertical axis 43 the forward plow beam section 32 is held against swinging relative to the tractor, except for the movement that results from the lateral displacement of the upturned end 46, and therefore when the plow swings laterally about the pivot 43 the arm 119 will act through the link 118 and the rear steering arm 117 to steer the rear furrow wheel so that it takes a position with respect to the line of travel that accommodates the turning of the outfit.

When it is desired to raise the plow into a transport position, the tractor valve mechanism V is operated to raise the tractor drawbar 15 the full amount, this being the position shown in Figure 3. During the raising action the point of hinged connection between the front and rear beam plow sections is, of course, raised, and hence the chain 53 goes slack since the axis defined by the beam section 36 is raised and the connection points 54 and 55 brought closer together. As the drawbar is swung upwardly, the front end of the rear plow beam structure 33 is raised and the furrow openers 84 and 94 lifted entirely out of engagement with the ground, the implement swinging about the rear furrow wheel 70 of a fulcrum. At the same time, the forward swinging of the vertical arm 114 exerts a pull on the link 112 which swings the bell crank 106 (Figure 1) in a counterclockwise direction and raises the rear end of the plow beam relative to the rear furrow wheel 70.

When it is desired to disconnect the implement from the tractor, all that it is necessary to do is to remove the single pivot pin 43 and drive away with the tractor. If desired and necessary, a stand may be provided for holding the plow in upright position when detached from the tractor. The implement may be reattached to the tractor, merely by backing the latter into position, raising or lowering the drawbar of the tractor by the power lift unit until the rear bar 16 passes in between the attaching plates 41 and 42 into a position to facilitate the insertion of the pivot pin 43. At the same time that the drawbar part 16 starts in between the plates 41 and 42, the front end of the beam section 32 is held in position to pass into the yoke or bail 61. To this end, a second stand may be provided for holding the front end of the plow beam bar 32 in position, or it is a relatively simple matter to block up the same in the proper position for reattaching when disconnecting the implement. In some cases it may not be necessary to raise the rear end of the plow frame relative to the rear furrow wheel 10, and in such instances the raising link 112 and associated parts may be omitted, this being the construction shown in Figure 3. In this case, the rear sleeve section 73 is held against vertical displacement on the spindle 72 by collars 130 or the like.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A tractor mounted plow comprising a generally longitudinally extending plow beam comprising front and rear sections hingedly connected together, furrow opening means carried by the rear section of the plow beam, said tractor having a draft transmitting member connected at one end to the tractor, means for connecting the other end of said member to the front end of said rear plow beam section, means acting against said sections and accommodating downward pivoting of the rear plow beam section but limiting the upward pivoting of the rear plow beam section relative to the forward section, and means adapted to act between the tractor and the front plow beam section for raising and lowering the forward end portion of said front section relative to the tractor so as to control the depth of plowing.

2. A tractor mounted plow comprising a generally longitudinally extending plow beam comprising front and rear sections hingedly connected together, furrow opening means carried by the rear section of the plow beam, said tractor having a draft transmitting member connected at one end to the tractor, means for connecting the other end of said member to the front portion of said rear plow beam section, ground engaging means at the rear end of said rear section rearwardly of said furrow openers, means acting against said sections and accommodating downward pivoting of the rear plow beam section but limiting the upward pivoting of the rear plow beam section relative to the forward section, means connected with the front plow beam section for raising and lowering the forward end portion thereof so as to control the depth of plowing, and generally upwardly acting means connected with said plow beam adjacent the hinged connection between said sections for raising the hingedly connected portions of said beam sections relative to the front portion of said front plow beam section and relative to said ground engaging means at the rear end of said rear plow beam section so as to raise the furrow openers out of contact with the ground.

3. A plow adapted to be connected to a tractor, including a plow beam comprising front and rear sections hingedly connected together for relatively free movement in at least one direction, one relative to the other, about a generally vertical axis, furrow opening means carried by the rear section of the plow beam, said tractor having a draft transmitting member, means for connecting said draft transmitting member to the front end of said rear section, means acting between said beam sections for limiting the upward pivoting of the rear plow beam section relative to the forward section, and means connected with the front plow beam section for raising and lowering the forward end portion thereof so as to control the depth of plowing.

4. In a tractor mounted plow adapted to be connected to a tractor having a rear drawbar and means for raising the drawbar, a plow beam comprising front and rear sections hingedly connected together for relatively free movement in one direction, a rear furrow wheel carried by the rear end of the rear beam section, a furrow opener also carried by said rear beam section forwardly of said rear furrow wheel, means adapted to be carried by the tractor and engageable with the front end of said front beam section for raising and lowering the latter, means engageable with said plow beam adjacent the hinged connection between the front and rear sections of said beam for raising said rear section and said furrow openers, and means connected between said beam sections for limiting the downward pivoting of the hingedly connected portions of the front and rear beam sections relative to the end portions of said front and rear beam sections, whereby the rear furrow wheel and front beam section may determine the depth of operation of said furrow opener.

5. A plow adapted to be connected to a tractor, including a plow beam comprising front and rear sections hingedly connected together for movement, one relative to the other, about transverse and vertical axes, a rear dirigible furrow wheel and a furrow opener carried by the rear section of said plow beam, said tractor having draft means for connnecting the front portion of the rear beam section to the tractor and accommodating lateral swinging of said rear beam relative to the tractor and the front beam section, a steering linkage connecting said dirigible rear wheel with said front beam section, means acting between said beam sections for limiting the upward pivoting of the rear plow beam section relative to the forward section, generally upwardly acting means connected with said plow beam adjacent the hinged connection between said sections for raising the hingedly connected portions of said beam sections relative to the front portion of said front plow beam section and relative to said rear furrow wheel so as to raise the furrow openers out of contact with the ground, and means adapted to be carried on the tractor and connected with the front plow beam section for raising and lowering the forward end portion thereof so as to control the depth of plowing.

6. A semi-integral tractor plow comprising an articulated beam structure including two hingedly connected sections, means connecting said sections whereby the hingedly connected portions of said sections are held against downward deflection relative to the end portions of said beam sections opposite said hingedly connected portions but said end portions are capable of pivoting downwardly one relative to the other, a rear furrow wheel connected to the rear portion of the rear section, a furrow opener fixed to the rear section forward of said rear furrow wheel, draft transmitting means, means for connecting said draft transmitting means with the forward end of the rear section, and means connected with said beam adjacent the hinged connection of said sections for raising the furrow opener out of contact with the ground.

7. In a semi-integral plow adapted to be mounted on a tractor, comprising an articulated beam structure including front and rear sections and means hingedly connecting said sections together, means connected between said sections to limit the hinging action of one section relative to the other in a direction to prevent downward deflection of the beam in operation but accommodating upward movement of the interconnected end portions of said sections, a ground engaging part at the rear end of said rear section, means connected with said beam structure for raising and lowering said rear section about said ground engaging part as a fulcrum, plowing means carried by said rear section forward of said part, and means connected with the front end of the front section interconnected with said raising and lowering means for controlling the depth of plowing.

8. A semi-integral tractor mounted plow comprising a beam stucture including a generally diagonally extending beam member having its forward end shaped to extend laterally, a furrow opener carried by said beam member, means hingedly connected with the laterally extending forward portion of said beam member for connecting the latter to the tractor, a rear furrow wheel at the rear end of said beam member, a forwardly extending part, means providing a pivotal connection between the rear portion of said part and the forward portion of said beam member whereby said beam member and part may swing each relative to the other about a transverse axis, and means connected with said beam member and said part for limiting the upward movement of said part relative to said beam member about said transverse axis, whereby raising and lowering the front end of said part serves to raise and lower said furrow opener relative to said rear furrow wheel and thereby control the depth of plowing.

9. A semi-integral tractor implement adapted to be connected to a tractor having a bar-receiving part, said implement comprising a beam section, connecting means for connecting said beam section with the tractor for movement relative thereto about a generally vertical axis, a dirigible rear wheel carried at the rear end of said beam section, a ground engaging tool carried by the latter forward of said rear wheel, a bar having a pivotal connection at its rear end with the forward portion of said beam structure and movable relative to the latter about a generally vertical axis, the forward end of said bar being received by the bar-receiving part on the tractor, a steering arm fixed to said bar, a steering arm connected to steer said rear wheel, and a connection between said arms whereby when said implement pivots laterally relative to the tractor, the movement between the implement and said bar serves to steer said rear wheel.

10. The invention set forth in claim 9, further characterized by said rear furrow wheel being shiftable vertically relative to the rear end of said beam member, said connecting means including hitch means for connecting the forward end of said beam member with the tractor and shiftable generally vertically to raise the furrow opener out of operating position, and means connected with said vertically shiftable hitch means for raising the beam structure relative to the rear furrow wheel when said hitch means is shifted to raise the furrow opener out of the ground.

11. For use with a tractor having a drawbar, an agricultural machine including a beam member disposed in a generally longitudinal position, a drawbar-receiving part at the front portion of said beam member, a dirigible wheel for supporting the rear end of said beam member, means for connecting said drawbar-receiving part with the tractor drawbar, pivot means connecting said beam member with said drawbar-receiving part, a control bar adapted to be connected at its forward end with the tractor, means pivotally connecting the rear end of said control bar with the front portion of said beam member for movement relative thereto about a generally vertical axis, and a steering connection between the rear portion of said control bar and said dirigible wheel for steering the latter in accordance with changes in the position of the beam member relative to the tractor.

12. A tractor propelled agricultural implement comprising a beam member including sections pivotally connected together for movement one relative to the other about a generally vertical axis, means connecting the forward portion of the rear section to the tractor for movement relative thereto about a generally vertical axis, a dirigible rear wheel at the rear of said rear beam section, means for connecting the forward end portion of said forward beam section to the tractor whereby when said rear section swings laterally relative to the tractor a portion of the forward end of said forward section is held against lateral movement relative to the tractor, and a steering connection between said forward beam section and said rear dirigible wheel.

13. A tractor propelled agricultural implement comprising a beam member including sections pivotally connected together for movement one relative to the other about a generally vertical axis but held against relative movement in a generally vertical direction whereby raising the forward end of the front section serves to raise the rear beam section, ground working tool means on said rear section, means connecting the forward portion of the rear section to the tractor for movement relative thereto about a generally vertical axis, a dirigible rear wheel at the rear of said beam section, means for connecting the forward end portion of said forward beam section to the tractor whereby when said rear section swings laterally relative to the tractor a portion of the forward end of said forward section is held against lateral movement relative to the tractor, means on the tractor for raising the front beam section to control the depth of operation of said tool means, and a steering connection between said forward beam section and said rear dirigible wheel.

14. An implement adapted to be connected with a tractor, comprising a frame, ground working means carried thereby, means mounting the forward end of said frame on the rear portion of the tractor and including pivotally interconnected parts swingable one relative to the other about a generally vertical axis, a rear dirigible wheel supporting the rear end of said frame, a bar pivotally connected at its rear portion with said frame and connectible at its forward portion with the tractor to turn laterally with the latter relative to said frame, and a steering connection between said bar and rear dirigible wheel.

15. For use with a tractor having a generally vertically swingable power lift operated drawbar, the improvement comprising a generally fore and aft extending plow beam member carrying one or more furrow openers, a front beam section including a forward part adapted to extend forwardly underneath the tractor, a swingable support adapted to be carried by the tractor and constructed to engage and support the front portion of said part, the rear portion of said front beam section having an upwardly extended part, a hinged connection between the front end of said plow beam member and the rear portion of said front beam section providing for generally vertical movement of said plow beam relative to said front beam section, an adjustable connection extending from said upwardly extended part to the rearward portion of said plow beam member, and a part hingedly connected to the front end of said plow beam member and constructed to receive said tractor drawbar whereby upward movement of the latter serves to lift said plow beam member.

16. For use with a tractor having a generally vertically swingable power lift operated drawbar and a forwardly disposed bar-receiving bail mounted for generally vertical movement relative to the tractor and interconnected with said drawbar so as to be operated thereby: the improvement comprising a generally fore and aft extending plow beam member carrying one or more furrow openers, a front beam section including a forward part adapted to extend forwardly underneath the tractor to be engaged by said bail, the rear portion of said front beam section having an upwardly extended part, a hinged connection between the front end of said plow beam member and the rear portion of said front beam section providing for generally vertical movement of said plow beam relative to said front beam section, an adjustable connection extending from said upwardly extended part to the rearward portion of said plow beam member, and a part hingedly connected to the front end of said plow beam member and constructed to receive said tractor drawbar whereby upward movement of the latter serves to lift said plow beam member.

17. For use with a tractor having a generally vertically swingable power lift operated drawbar, the improvement comprising a generally fore and aft extending plow beam member carrying one or more furrow openers, a front beam section including a forward part adapted to extend forwardly underneath the tractor, a swingable support adapted to be carried by the tractor and constructed to engage and support the front portion of said part, the rear portion of said front beam section having an upwardly extended part, a connection between the front end of said plow beam member and the rear portion of said front beam section providing for both generally vertical and generally lateral swinging movement of said plow beam relative to said front beam section, a steerable rear wheel supporting the rear end of said beam member, an arm fixed to the upwardly extended part of said front beam section, an adjustable connection extending from said arm to said steerable rear wheel, and a part hingedly connected to the front end of said plow beam member and constructed to receive said tractor drawbar whereby upward movement of the latter serves to lift said plow beam member about said rear wheel as a fulcrum.

WALTER H. SILVER.
WILLIAM V. LOHRMAN.

References Cited in the file of this patent

UNITED STATES PATENTS

| Number | Name | Date |
|---|---|---|
| 1,148,088 | Heylman | July 27, 1915 |
| 1,200,107 | Heylman | Oct. 3, 1916 |
| 1,556,508 | Hentzell et al. | Oct. 6, 1925 |
| 2,065,015 | Nielsen | Dec. 22, 1936 |
| 2,271,533 | Altgelt | Feb. 3, 1942 |
| 2,307,980 | Avrett, Jr. | Jan. 12, 1943 |
| 2,339,225 | Strandlund | Jan. 11, 1944 |
| 2,416,194 | Miller | Feb. 18, 1947 |

FOREIGN PATENTS

| Number | Country | Date |
|---|---|---|
| 473,798 | France | Oct. 15, 1914 |
| 276,612 | Italy | Aug. 6, 1930 |
| 349,463 | Italy | June 15, 1937 |